March 28, 1972 E. C. BRIGGS Re. 27,321

OIL BURNER

Original Filed April 8, 1964 4 Sheets-Sheet 1

INVENTOR.
EUGENE C. BRIGGS
BY Tom Walker
Jerome P. Bloom
ATTORNEYS

OIL BURNER

Original Filed April 8, 1964 4 Sheets-Sheet 2

INVENTOR.
EUGENE C. BRIGGS
BY Tom Walker
Jerome P. Bloom
ATTORNEYS

OIL BURNER

Original Filed April 8, 1964 4 Sheets-Sheet 3

INVENTOR.
EUGENE C. BRIGGS
BY Tom Walker
Jerome P. Bloom
ATTORNEYS

OIL BURNER

Original Filed April 8, 1964 4 Sheets-Sheet 4

INVENTOR.
EUGENE C. BRIGGS
BY Tom Walker
Jerome P. Bloom
ATTORNEYS

United States Patent Office

Re. 27,321
Reissued Mar. 28, 1972

27,321
OIL BURNER

Eugene C. Briggs, Dayton, Ohio, assignor to Koehring Company, Milwaukee, Wis.

Original No. 3,298,418, dated Jan. 17, 1967, Ser. No. 358,356, Apr. 8, 1964. Application for reissue Jan. 14, 1969, Ser. No. 806,749
Int. Cl. F23d *15/02*
U.S. Cl. 431—352 17 Claims

Matter enclosed in heavy brackets [ ] appears in the original patent but forms no part of this reissue specification; matter printed in italics indicates the additions made by reissue.

This invention relates to an oil burner unit featuring a more complete fuel combustion, greater safety and versatility in use and economy in operation.

A primary object of the invention is to provide an oil burner unit which is economical to fabricate, more efficient and satisfactory in use, adaptable to a wide variety of applications and unlikely to malfunction.

Another object of the invention is to provide a small, compact, yet highly efficient oil burner unit.

A further object of the invention is to provide an oil burner unit in the operation of which the transmitted fuel is both atomized and vaporized.

An additional object of the invention is to provide an oil burner unit including controls which effectively inhibit inadvertent after flow and noxious fumes.

A further object of the invention is to provide an oil burner unit which utilizes a constant level diaphragm regulated flow control for its fuel supply.

A further object of the invention is to provide an improved oil burner unit which can be used in application to a water heater or the like without the addition of a conventionally insulated combustion chamber.

Another object of the invention is to provide an oil burner unit in which the first visual indication of combustion is displaced from the ignition area.

An additional object of the invention is to provide an oil burner unit wherein preheated air is utilized to vaporize the delivered fuel whereby to afford a more complete combustion process.

Another object of the invention is to provide an oil burner unit which provides a safe quiet flame.

An additional object of the invention is to provide an oil burner unit possessing the advantageous features, the inherent meritorious characteristics and the means and mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

Like parts are indicated by similar characters of reference throughout the several views.

Figure 1:
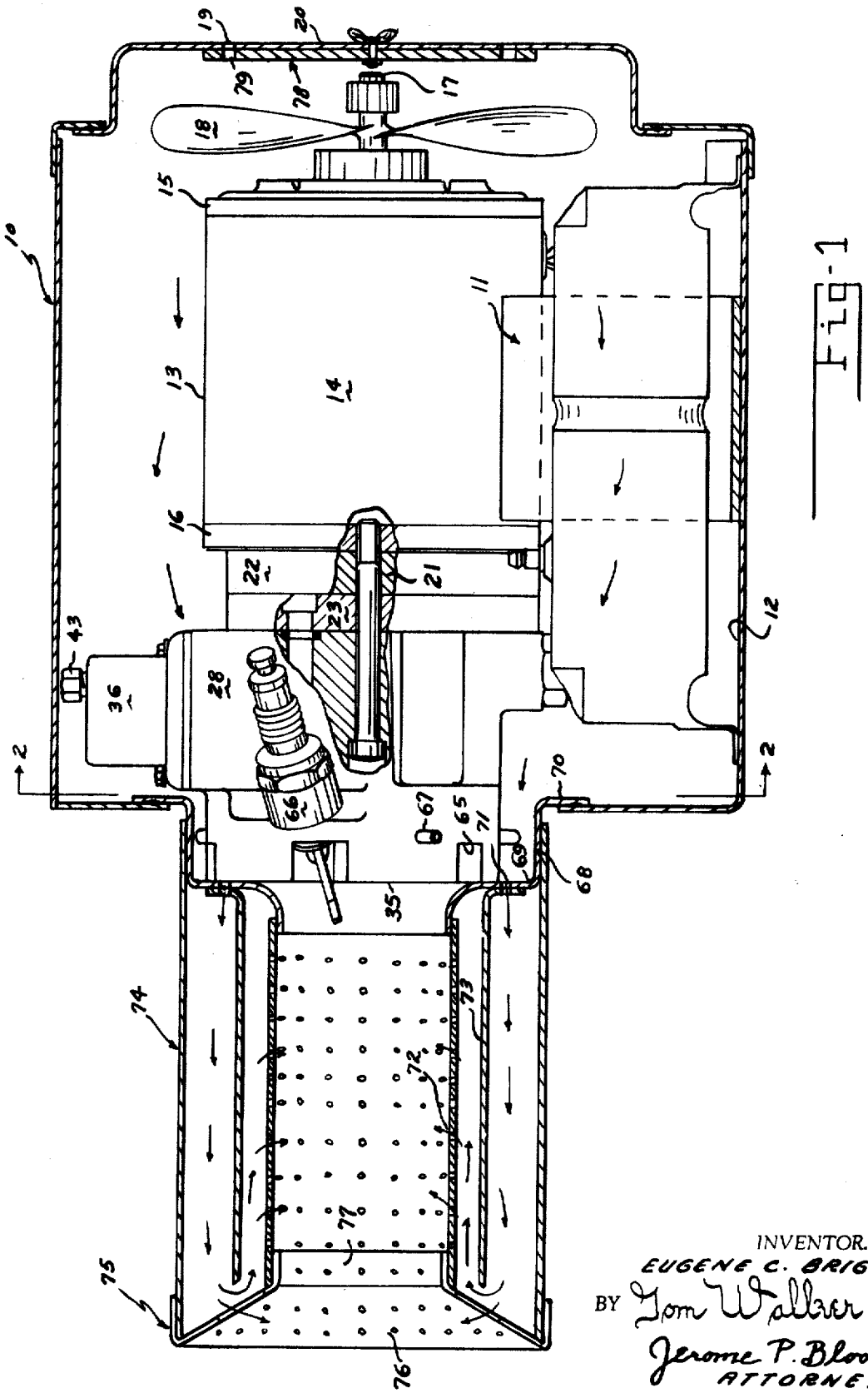
FIG. 1 is a side elevation view of an oil burner unit in accordance with the invention, shown partly in section.

As seen in the drawings the shell 10 provides a box-like enclosure for a saddle 11 fixed centrally of its base 12. Nesting in the saddle 11 is the housing 13 of a motor 14. The motor 14, which orients in a sense longitudinally of the shell 10, mounts to one end thereof a closure plate 15 and to its other end a closure plate 16. The housing 13 encompasses a stator surrounding a rotor (not shown). The rotor incorporates the motor drive shaft 17, one end of which projects through a bearing in the plate 15 and the other end of which projects through a bearing in the plate 16. Fixed to one end of the shaft 17, spaced outwardly of the plate 15 is a blade unit 18. As will be further described, on drive of the rotor 17, the unit 18 serves as a fan to draw air interiorly of the shell 10 through a series of circularly spaced openings 19 defined in its adjacent end panel 20.

Figure 2:
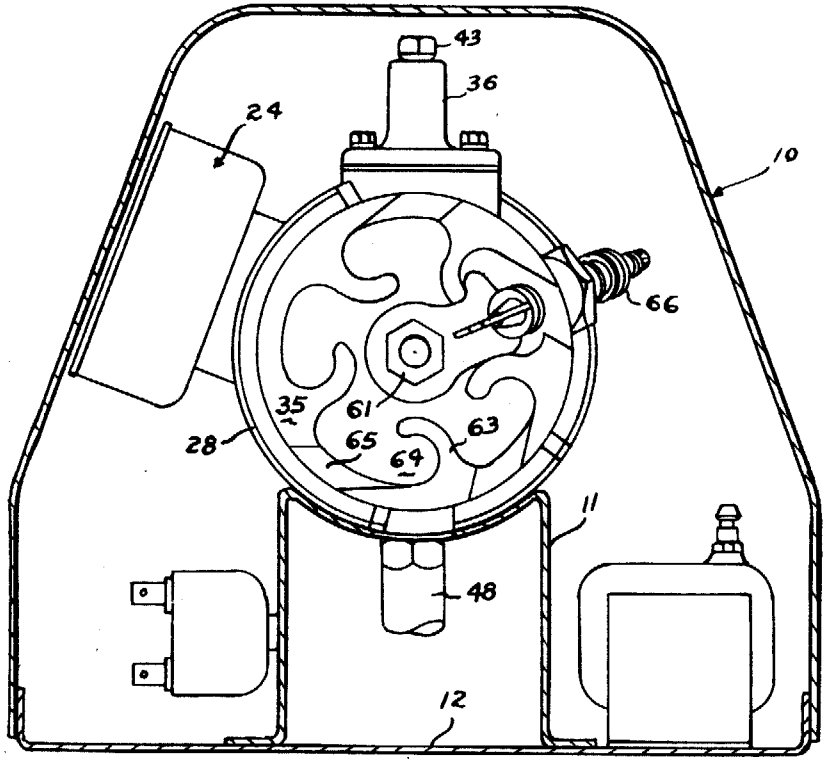
FIG. 2 is a view taken on line 2—2 of FIG. 1.
Figure 3:
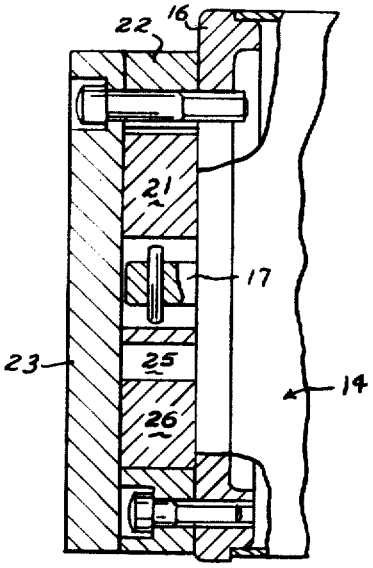
FIG. 3 is a fragmentary sectional view of a portion of the burner unit which illustrates its compressor features.
Figure 4:
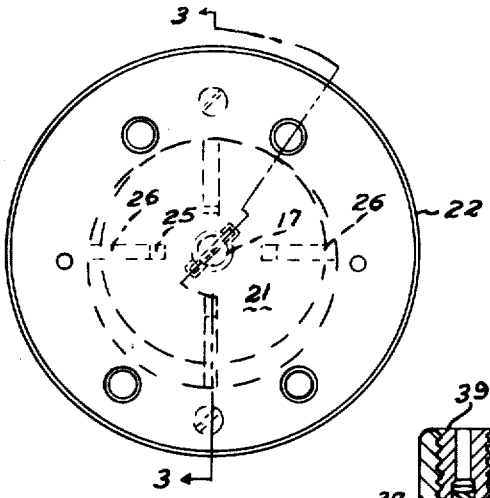
FIG. 4 is an end view of the compressor section illustrated in FIG. 3.
Figure 5:
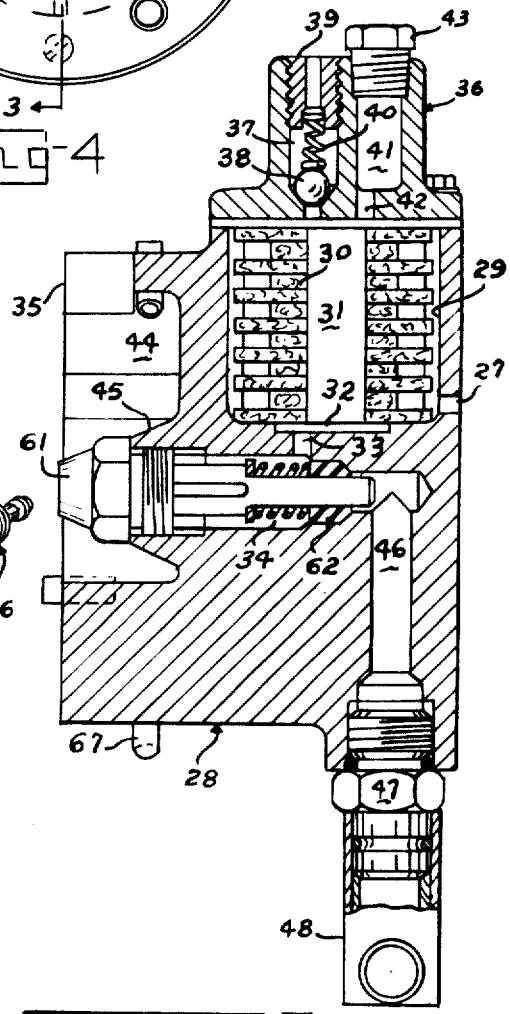
FIG. 5 is a sectional view of the burner head.

The opposite end of shaft 17 terminates outwardly of and adjacent to the plate 16 and fixedly mounts a compressor rotor 21. Fixed to the plate 16 to position about and in eccentric relation to the rotor 21 is a ring-shaped enclosure 22. Fixed over and coextensive with the outermost face of the ring 22 is a closure plate 23. The plates 16 and 23, together with the ring 22, form a compressor housing. Included in the ring 22 is an aperture which provides an inlet for passage of air to the interior of the compressor housing under the influence of a spinning rotor 21. Fixed on the exterior of the ring 22 to bridge this inlet aperture is a filter unit 24 which may be observed with reference to FIG. 2 of the drawings.

The rotor 21 has a disc shape. Its periphery has four radial slots 25, spaced 90° apart, each slot accommodating a relatively free sliding vane 26. As the motor 14 is suitably energized, shaft 17 will spin the compressor rotor 21. As this occurs, the vanes 26 move outwardly of the rotor, in any one instant, to the extent permitted by the spacing of the interior surface of the eccentrically positioned ring enclosure 22.

A discharge opening included in the closure plate 23 has one end in communication with the space between the compressor rotor 21 and the ring 22. The other end of this opening communicates with a delivery passage 27 in a burner head 28. The head 28 is so connected to the plate 23 to form an axial extension of the motor 14 and its integrally connected compressor housing.

It will be readily apparent that on drive of the compressor rotor 21, as the vanes 26 successively pass the air inlet opening, they will induce air to move interiorly of the compressor housing to enter the limited space between the rotor and ring 22. This air is driven by immediately following vanes 26 to first expand, then be compressed and force to exit under pressure through the opening in the plate 23 to enter the delivery passage 27. The passage 27 communicates, in turn, with a recess 29 formed in the top of the burner head 28. The recess 29 nests a tubular filter 30 the exterior of which includes radially projected fins forming spaced air passages adjacent the recess wall. The air which flows under pressure from the passage 27 enters tangentially to the wall of recess 29 to swirl about and move radially inward of the filter 30 and exit to the cylindrical passage 31 which is defined by its inner wall. The base of the recess 29 is centrally recessed to accommodate a disc shaped filter 32 which overlies an opening constituting one end of a flow passage 33. The other end of passage 33 communicates with the inner end of a nozzle recess 34 formed in the operating face 35 of the burner head 28.

The recess 29 is capped by a valve housing 36 including a vertical through passage 37 inner end of which communicates with the recess. Adjacent its inner end, the passage 37 is conically reduced to form a valve seat for a ball type pressure regulator 38. A tubular plug 39 threadedly engaged to the valve housing in the outer end of passage 37 contains a spring 40 under compression. The spring biases the regulator 38 to normally seal the passage 37 in reference to the recess 29. The valve housing includes, at its outer surface, adjacent the passage 37, a recess 41 the base of which has an aperture 42 communicating with the filter passage 31. A plug element 43 normally seals the outer end of the recess 41.

The burner head operating face 35 includes a central recess 44 projecting from the base of which, at its center, is a short generally conical projection 45. The projection 45 defines the outermost end of the nozzle recess 34. The recess 34 forms a passage which is successively reduced in cross-sectional dimension at spaced intervals from its outer end to its innermost end, the latter of which intersects and communicates with a fuel supply passage 46, at right angles thereto. Connected in the outermost end of the passage 46, at the bottom of the burner head, is a fitting 47 which serves to interconnect a fuel supply line 48. The supply line 48 is in communication with a suitable source of fuel.

Figure 6:
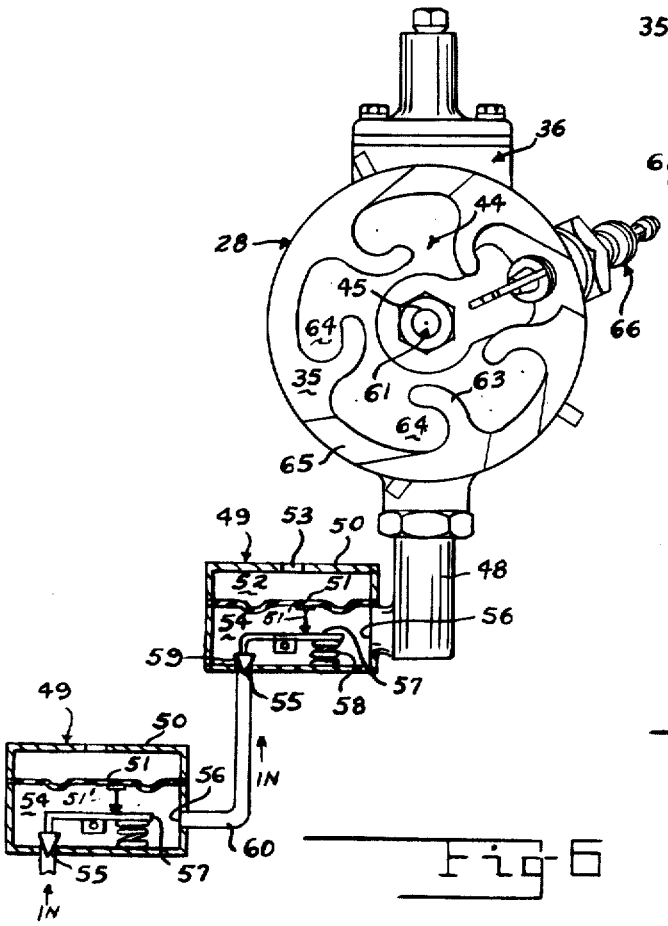
FIG. 6 is a view of the delivery end of the burner head, including a schematic illustration of the regulator system which controls the delivery of fuel to said head.

Interposed in the line 48 is a pair of series related, diaphragm controlled flow regulators 49, shown schematically in FIG. 6 of the drawings. As shown, each of the regulators 49 consists of a housing 50 intermediately bridged by a diaphragn 51 which forms, to one side thereof, a chamber 52 from which there is a vent opening 53 in communication with the atmosphere. To the other side of the diaphragm 51 is a second chamber 54. Chamber 54 has an inlet opening 55 and a discharge opening 56. Positioned intermediate the inlet and discharge openings is a pivoted valve arm 57 normally biased by a spring 58 to have its head 59 seal the inlet opening 55. A control pin 51′ fixed to the diaphragm 51 projects inwardly of the chamber 54 to abut the biased end portion of the valve arm 57 for purposes to be further described. The flow regulators 49 are interconnected by a conduit section 60 which extends between the discharge opening 56 of one regulator and the inlet opening 55 of the other. As may be seen, each of the openings 55 are normally sealed by the head 59 of the respectively associated valve arm 57. The flow regulating system so provided precludes the passage of fuel to the burner head except under the influence of a positive demand, as will be further described.

Threadedly engaged in the outermost end of nozzle recess 34 is a low pressure aspirating nozzle 61 the expanded head of which abuts the outer end of projection 45 to limit the advance of the nozzle interiorly of the recess 34. The nozzle 61 has a conventional central fuel passage and small bore aspirating passages which mutually intersect the fuel passage adjacent the outer extremity of the nozzle. Within the recess 34 the body of nozzle 61 is successively reduced in cross-section to provide a swirl passage thereabout in the area of the recess which communicates with the flow passage 33. The entrance ends of the aspirating passages open to this swirl passage. Inwardly of the flow passage 33, in immediate advance of the fuel passage 46, the recess 34 is bridged by a tubular seal 62. The seal 62 surrounds the reduced inner extremity of the nozzle which opens to the fuel passage.

Referring to FIG. 6 of the drawings, recess 44 is rimmed by a generally cylindrical wall structure. Formed integral with and projected from the inner surface of this wall structure are arcuately curved fingers 63. The fingers 63 curve in a common direction so as to define, within the recess 44, a series of circularly spaced pockets 64 which open about the head of the nozzle 61. The recess wall structure includes, adjacent each of the pockets 64, a relatively angled slot 65 which orients in a sense to open tangential to the inner surface of the adjacent finger 63.

An igniter element 66 is so incorporated in the wall of the burner head 28 to have its electrodes project from the operating face 35 and position immediately adjacent the outermost end of the nozzle 61.

The end panel of the shell 10 remote from its end panel 20 is centrally apertured to accommodate the projection therethrough of the peripherally slotted portion of the burner head. Spaced circumferentially of this projected portion of the burner head 28 are radially projected studs 67. The studs 67 respectively engage in bayonet type slots in the cylindrical formed skirt portion of a cap 68. The cap 68 has its skirt portion positioned concentrically of and in spaced relation to the projected portion of the burner head. At the inner extremity of its skirt portion the cap 68 has a radial flange 70 which serves to abut the adjacent end panel and be suitably fixed thereto about its central aperture. The cap 68 also includes a centrally apertured bridging plate portion 69 which overlies the outer peripheral portion of the operating face 35 including the outer portions of the pockets 64. The portion of plate 69 which defines its central aperture is conically flared in a sense outwardly of the operating face 35 and concentric to the nozzle 61. Included in the outer peripheral portion of the plate 69, in a sense outwardly of the burner head 28, are a series of apertures 71, the purpose of which shall be further described.

Fixed to form an axial extension of the conically flared portion of the cap 68 is a tubular combustor tube 72. The tube 72 has perforations spaced both circumferentially and throughout its longitudinal extent.

A deflector tube 73 extends in coextensive and concentric spaced relation to the combustor tube 72. The tube 73 is fixed to the plate portion 69 through the medium of a peripheral flange at one end thereof, which flange includes apertures in direct alignment with the apertures 71. The deflector tube is unperforated.

Connected at one end immediately about and in fixed relation to the skirt portion of the cap 68 is a housing tube 74. The tube 74 extends in concentric spaced relation to the tube 73 and projects therebeyond, as may be seen from FIG. 1 of the drawings.

The outer end of the tube 74 is capped by a flame spreader 75. The flame spreader 75 includes a skirt portion which overlies and rims the outer end of the tube 74 and a conically dished central portion 76 which bridges the space between the outer end of the tubes 72 and 74, displaced thereby from the outer end of tube 73. The spreader 75 has a central aperture defined at the inner limits of the portion 76 by a tubular projection 77 which nests interiorly of the outer end of combustor tube. Noting the drawings, it may be seen that the flame spreader 75 is provided throughout its extent with a series of uniformly spaced apertures.

Reference is made to FIG. 1 of the drawings where it may be seen that a valve plate 78 is rotatably fixed on the inner side of the shell panel 20. The plate 78 includes circularly spaced apertures 79 which may be selectively aligned in total or in part with the apertures 19 in the end panel 20.

The embodiment of the invention above described functions in the following manner. On energizing the motor 14 both the blade unit 18 and the compressor rotor 21 are caused to spin. The blade unit is so formed to draw air interiorly of the shell 10 through the apertures in the end panel 19 to the extent selectively permitted by an appropriate setting of the valve plate 78. This air is induced to provide a cooling flow about the motor 14, the compressor housing, and the burner head. At the burner head, adjacent the plate portion 69 of the cap 68, a portion of this air flows through the tangential slots 65 to swirl in the pockets 64 and exit about the head of the nozzle 61 in a turbulent swirling flow.

At the same time, the rotor 21, by means of its vanes 26 draws air through the filter 24 to the interior of the compressor housing. The air is compressed and discharged to flow under pressure through the opening in the plate 23 to the head passage 27. From the passage 27 the air enters the recess 29, tangential to its inner wall, induced thereby to swirl about the filter 30 and move radially inward thereof to the interior passage 31, arriving there in a purified condition. The air is forced from passage 31 to move under pressure through the second filter 32 and the flow passage 33 to the nozzle recess 34. As the air is caused to enter the nozzle recess 34, it is directed tangentially of its inner wall to swirl about the intermediate portion of the nozzle, which portion includes the entrances to the nozzle aspirating passages. Moving through the relatively reduced aspirating passages, the air reaches a high velocity as it exits to the discharge end of the nozzle fuel passage and flows from the nozzle head. This high velocity air produces a suction in the passage 46 and line 48. This suction encounters the flow regulators 49 and successively operates on each regulator to cause its diaphragm to move inwardly of its chamber 54 and, through the medium of control pin 51', induce a movement of the associated valve arm 57. The arm 57 is so pivoted as to displace the head 59 from the inlet opening 55. It is to be understood, of course, that the regulators operate in direct sequence and when both of the inlet openings 55 are cleared, the suction is applied to a source of fuel supply to draw the fuel through the regulators, the fuel line 48, the passage 46 and the fuel passage in the nozzle 61. At the discharge end of the nozzle fuel passage, the fuel is caught up in the high velocity air which flows from the aspirating passages to be partially atomized thereby and entrained for movement therewith from the head of the nozzle. The fuel-air mixture issues as a fine spray which is caught up in a swirling flow of air which exits from the pockets 64 about the head of the nozzle. The swirling air from the pockets induces a further atomization of the fuel and the resulting highly atomized fuel mixture is induced, in the process, to flow outwardly from the operating face 35, through the flared portion of the cap 68 which defines the entrance to the combustor tube 72.

While a portion of the air flow from the fan 18 enters the slots 65 in the burner head, the majority of this air encounters the plate portion 69 of the cap 68 about the slotted portion of the burner head and exits through the apertures 71 at a high velocity. The air which exits through the apertures 71 flows outwardly of the head 28 between the tube 73 and the housing tube 74.

As mentioned previously, a highly atomized fuel exits through the central aperture in the cap 68 to the combustor tube. In the process, it passes the electrodes of the igniter 66 which applies a spark to initiate combustion. Due to the perforations in tube 72, the tube 73 is exposed to heat of combustion and is heated thereby. The air which moves about the tube 73, in turn, draws heat therefrom in passing. Thus, by the time the air from the fan 18 reaches the end of the tube 73, its temperature is highly elevated. At this point a substantial portion of the so-heated air is inherently induced by back pressure to reverse its flow and enter the space between the tube 73 and the combustor tube 72. Referring to FIG. 1, this process, in the embodiment shown, is assisted by the deflector capacity of the spreader portion 76. However, irrespective of this, there is an inherent back pressure on the air flow which per se is capable of inducing a portion of the preheated air to flow between the tubes 73 and 72 and swirl into the combustor tube through its perforations. Thus, preheated air is caused to continuously flow about the projected end of the tube 73 and, in part, back in and about the combustor tube to enter the combustor tube in a relatively turbulent condition. This condition causes a thorough mixture of the preheated air and the highly atomized fuel which exists in the combustor tube. The temperature of the preheated air is such that on contact therewith the atomized fuel is immediately and fully vaporized. It is a consequence of this system wherein fuel is super-atomized and then vaporized, that on ignition of the fuel as it issues from the the nozzle a non-luminous burning occurs in the vicinity of the igniter means and a luminous burning first appears adjacent the outer end of the combustor tube.

It will be seen that a substantial portion of the preheated air which reaches the spreader 75 flows through the apertures in the flame spreader. Due to the spreader contour, the visible flame which results from the burning of the fuel will pass along the surface of the spreader and be caused to assume the form of a small ball which is cupped by the spreader. The flame produced by the invention embodiment in this manner is both quiet and safe. Its nature is such that for what is believed to be the first time an oil burner as provided by the invention may be utilized in place of a conventional high pressure burner unit.

It will be seen from the above that due to the application of the preheated air the fuel is in effect reduced to a condition enabling a complete combustion. This means that every ounce of fuel is utilized in a highly effective manner. This also means that there is no remnant of fuel to produce noxious fumes.

A further feature of the invention is evidenced by the flow regulators in the fuel supply line. Their simple inclusion produces a condition that fuel will flow to the burner head only on demand. In absence of demand as evidenced by high velocity flow of air to the nozzle 61, there is a complete and immediate interruption of the system. Thus, the likelihood of afterflow is substantially eliminated. It is also a feature of the flow regulating system as applied to an oil burner unit that it enables a completely integrated unit which is not only more effective in use but extremely compact in character and low in cost. It is to be noted that the utilization of series related regulators insures that if one of the control arms 57 is inadvertently lodged in an open position, the other one will nevertheless act as a safety to prevent fuel flow except on proper demand.

Accordingly, the present invention provides improvements in oil burner units rendering them more efficient and satisfactory in use and more versatile in application.

Figure 8:
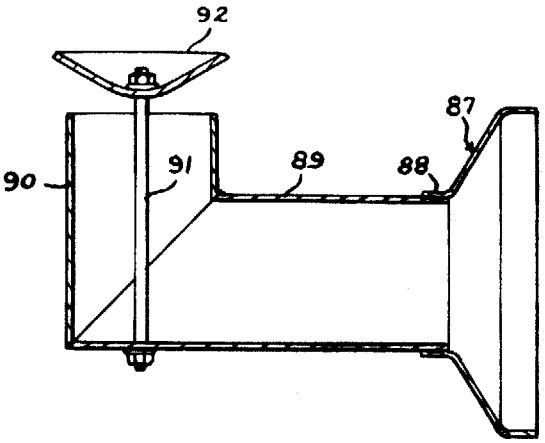
FIG. 8 is a sectional view illustrating a further modification.
Figure 7:
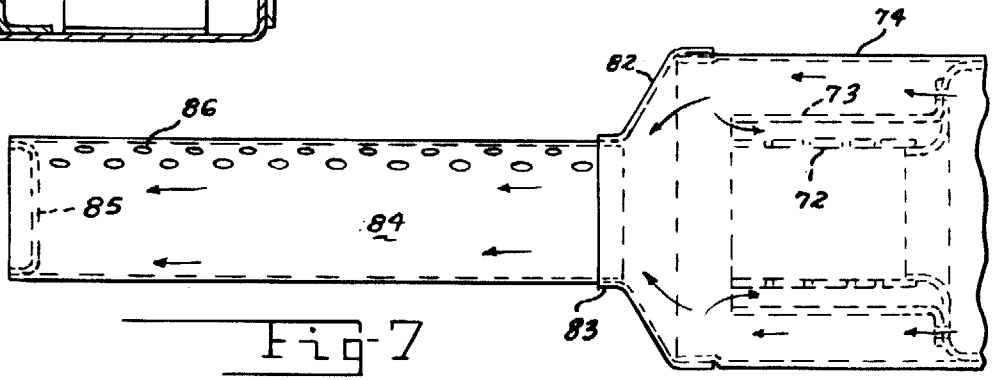
FIG. 7 illustrates a modification of the unit as shown in FIG. 1.

As a matter of fact, the efficiency and safety of the described burner unit is particularly evidenced by the modifications which may occur as seen in FIGS. 7 and 8 of the drawings.

Noting FIG. 7 of the drawings, in this embodiment the burner unit above described is relieved of the flame spreader 75 and, in lieu thereof, the end of housing 74 is fitted with a conically formed cap 82. The apex of the cap 82 which is relatively projected has a central aperture defined by a relatively projected sleeve 83. The sleeve 83 fixedly contains one end of a gun-like tube 84. Tube 84 orients coaxial with a combustor tube 72 and is capped at its projected extremity by a plate 85. Included in the upper surface portion of the tube 84, as shown in FIG. 7 of the drawings, are a series of longitudinally and arcuately spaced apertures 86.

The burner unit so modified functions in a manner as described above. It should be noted that even in absence of the flame spreader, the preheated air which flows to exit between the projected extremities of the tube 73 and the housing 74 will inherently be induced in part to reverse its flow to move inwardly between the tube 73 and the combustor tube and enter the combustor tube to function as previously described. The remainder of the preheated air continues in a pattern of flow created by the form of a cap 82 to entrain the visible flame which occurs in the outer end of the combustor tube and project it the length of the tube 84. The exposure of the flame as provided by the apertures 86 in the upper surface portion of the tube 84 enables the application of the burner unit so modified in lieu of the conventional high pressure burner unit. On placing the perforated portion of the tube 84 immediately under the unit to be heated, the burner unit described may be employed with complete safety and without the need for adding an insulated combustion chamber thereabout. Safety is inherent in the manner in which the flame is produced and the character of the flame. A complete vaporization of the fuel particles avoids any problem in reference to noxious odors and fumes.

It is to be particularly noted with reference to any one of the embodiments of the invention illustrated that the production of the preheated air in the manner described which serves to vaporize fuel particles in the combustor tube has the further advantage in that the remainder of this air is effectively employed to control the issuing flame and adds an element thereto which results in the burning of the fuel to occur in a slower and quieter fashion.

It is inherent also in the practice of this invention that the physical characteristics of the described structure and its function is such that in the process of producing a non-luminous burning of the fuel adjacent the igniter means, the igniter means are kept clean, more effective in use and longer in operation.

FIG. 8 of the drawings illustrates an addition to the burner unit of FIG. 1 which renders the burner unit highly advantageous in application to a water heater. As in the embodiment of FIG. 7, in this instance the flame spreader is removed from the embodiment of FIG. 1 and, in lieu thereof, the apparatus of FIG. 8 is applied. The accessory of FIG. 8 includes at one end thereof a conical cap 87 which fits about and over the housing tube 74 to have its apex project in a sense coaxial with the combustor tube 72. At its apex, the cap 87 has an aperture defined by a relatively projected cylindrically formed sleeve 88. Fixedly contained in the sleeve 88 is one end of a tube 89 having a right-angled section 90 at its outer extremity. A bolt 91 is fixed to the tube 89 to extend centrally and coaxially of the tube section 90. The bolt 91 relatively projects from the tube section 90 and has a flame spreader 92 at its outer extremity. The flame spreader 92 is in the shape of an inverted cone and is relatively spaced to form a cylindrical passage between its outer surface and the projected end of the tube section 90. On operation of the burner unit with this modification of the invention, the portion of the preheated air which passes the tube 73 which does not reverse its flow and enter the combustor tube moves outwardly of the tube 88 to carry therewith in a quiet flowing fashion the flame produced in the outer end of the combustor tube. The air flow is such to lead this flame to gently project between the tube section 90 and the flame spreader 92. In this instance also the flame burns in a quiet gentle fashion, assisted in the process by the secondary heated air which issues from between the tube 73 and the housing 74.

Figure 9:
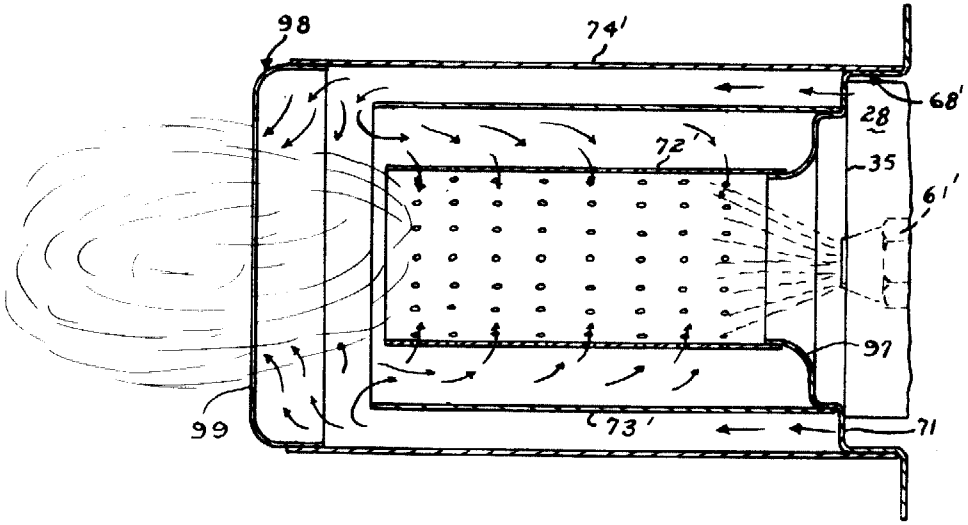
FIG. 9 illustrates a modification offering a preferred embodiment of the invention.
Figure 10:
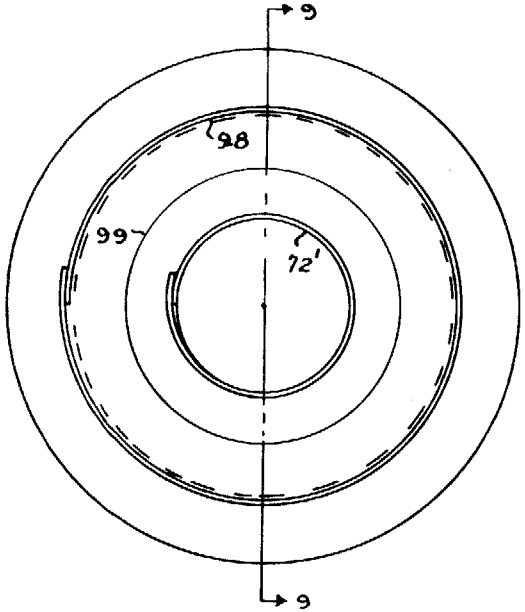
FIG. 10 represents the delivery end of the modification of FIG. 9.

A preferred embodiment of the invention is evidenced in the modification of FIGS. 9 and 10 of the drawings. In this instance the burner unit is identical with that of FIG. 1 except for certan changes.

The cap 68 is replaced by a cap 68'. The latter while including a skirt portion which similarly positions about and interconnects with the burner head 28 has a bridging plate portion 97 somewhat different in form from that of the plate portion 69. As in the case of the plate 69, the plate portion 97 has circularly spaced apertures 71' which orient about and are spaced outwardly of the burner head. However, immediately inward of its peripheral portion which includes the apertures 71', plate 97 is dished outwardly from the burner head operating face 35. At its inner periphery, the plate portion 97 is further projected in a conical form, outwardly convergent about and in a sense coaxial with the illustrated nozzle 61'. As in the first described embodiment, the conically convergent portion of plate 97 fixedly mounts a uniformly apertured tubular extension providing a combustor tube 72'.

In this instance, the dished portion of the plate 97 forms a cylindrical base mounting one end of the deflector tube 73' which thereby positions concentric with the combustor tube 72'. Tube 73' projects beyond the combustor tube to a slight degree. A tubular housing 74' has one end fixed about the skirt portion of the cap 68' and projects concentric to the tube 73'. The outermost end of housing 74' which extends beyond the tube 73' mounts a cap 98.

The cap 98 is cup-shaped and has a centrally apertured base opposed to and in line with the discharge end of the combustor tube. Its outer peripheral cup portion faces inwardly of the housing 74 in the direct path of air which may flow through apertures 71' and outwardly of the burner unit between the tubes 73' and 74'.

Thus, here also, in this preferred embodiment of the invention, the spreader 76 is eliminated.

In use of this embodiment of the invention, the burner unit will produce an atomized fuel spray which is further atomized as previously described with reference to the embodiment of FIG. 1. Also, the operations of fan 18 will similarly function with the burner head and plate portion 97 to provide air for the further atomizing of the fuel and additional air which flows through apertures 71' to move outwardly between the housing 74' and the shield 73'. However, in this instance air which is preheated in flow past the shield 73' in a manner as previously described, will impinge on the cup portion of the cap 98. This cup portion of the cap 98 introduces a measure of back pressure on the flow of preheated air and adds a directional increment to the air flow which causes a portion of the heated air to reverse its flow and pass inwardly within the confines of the tube 73' to enter the combustor tube through its perforations. This preheated air enters the combustor tube in a relatively turbulent condition to intermingle with the atomized fuel and, on contact therewith, produce an instant vaporization of such fuel.

This embodiment of the invention also functions to produce a double atomizing of the fuel and, subsequent thereto, a vaporizing of this atomized fuel in a manner and under conditions that the first visible burning of the fuel occurs in the outermost end of the combustor tube. The flame which is produced in the combustor tube in this instance is influenced by a portion of the preheated air which has its flow modified by the cup portion of the cap 98 to extend outwardly through the central aperture 99 in the cap base in a smooth rounded contour and to burn under the influence of the heated air which extends the flame in a quiet and relatively safe fashion. Thus, the combustion is complete, safe and efficient.

An inherent advantage of the preferred embodiment of the invention is the extreme simplicity of its fabrication and the efficiency of its function and operation.

From the preceding one may observe that by means of the present invention, there is produced a unique oil burner unit which so transmits the oil and so vaporizes the oil to enable it to burn and to handle like a low pressure gas. Thus, the invention has enabled a highly effective unit which may be safely applied to many applications not heretofore contemplated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An oil burner unit consisting of a burner head and, connected integral therewith, a compressor and a drive motor in end to end relation, means defining a nozzle recess in said head and, in connection therewith, a fuel passage, a low pressure aspirating nozzle having a portion anchored in said head to form a flow passage thereabout in said nozzle recess and have one end thereof communicate with said fuel passage, means defining a further passage in said head communicating said compressor with said flow passage whereby on drive of said motor, air will flow under pressure to swirl in said recess about said nozzle, said nozzle having aspirating passages which open at one end to receive the swirling air and deliver it at a high velocity to the interior of said nozzle whereby to suck fuel from said fuel passage to exit therewith from said nozzle and flow regulator means interposed to normally block the flow of fuel through said fuel passage, said regulator means having two chambers and a diaphragm forming a wall therebetween, one of said chambers having an inlet and an outlet interposed in respect to said fuel passage, the other said chambers having a vent and means included in said one chamber operative to block the flow of fuel through said fuel passage except on the occurrence of a high velocity flow of air to and through said nozzle.

2. An oil burner unit as in claim 1 characterized by said head having means in connection therewith for igniting the fuel on discharge from said nozzle, means defining a combustor tube for channeling the ignited fuel from said nozzle and means for delivering heated air to the interior of said combustor tube to effect a vaporization of the fuel particles therein on contact.

3. An oil burner unit including a motor having a drive shaft, a fan fixed at one end of said drive shaft, a compressor rotor fixed at the other end of said drive shaft, means fixed to said motor defining a housing for said rotor at said other end of said drive shaft, said rotor being eccentrically positioned in its housing, said rotor housing having an air inlet and, in a wall portion thereof remote from said motor, an air outlet, a burner head fixed to said rotor housing having an air supply recess and an aspirating nozzle fixed in said recess to form an air passage thereabout, a fuel supply line connectd to said burner head to provide for direct flow of fuel to and through said nozzle, means defining a flow passage through said burner head one end of which communicates with said air outlet, the other with said recess, aspirating passages formed in said nozzle for inducing high velocity inflow of air driven from said rotor through said outlet to the recess about said nozzle to induce fuel to flow and be atomized thereby on discharge from said nozzle and diaphragm controlled regulator means interposed to block the flow of fuel to said nozzle except on demand provided by a high velocity inflow of air through said aspirating passages.

4. The oil burner unit as set forth in claim 3 characterized by said regulator means consisting of two diaphragm operated valve means arranged in series relation and operative to successively respond to application of a predetermined suction induced by the high velocity inflow of air to said nozzle.

5. An oil burner unit comprising, a motor, a compressor fixed to form an extension of said motor, a burner head in connection with and forming an axial extension of said compressor, a low pressure aspirating nozzle fixed in and arranged to discharge from the end of said burner head remote from said compressor, means for connecting a supply of fuel to said nozzle, said nozzle having in connection therewith means defining a passage for the delivery thereto of a high velocity flow of air from said compressor to aspirate fuel from said supply and deliver said fuel from said nozzle in a highly atomized condition, said means connecting the supply of fuel to said nozzle incorporating therein a control regulator normally operative to prevent a flow of fuel to said nozzle, said regulator comprising a housing having fixed interiorly thereof a diaphragm defining two chambers, one of which is exposed to the atmosphere, means defining an inlet and an outlet in the other chamber positioned in the line of flow from said supply to said nozzle and means normally sealing said inlet and operative to block the flow of fuel therethrough to said nozzle except on the occurrence of a high velocity flow of air to and through said nozzle.

6. A low pressure oil burning unit including a discharge nozzle to which air and fuel lines extend, a burner head mounting said nozzle and having peripheral inlets for secondary air to combine with the mixture discharging from said nozzle, means for flowing secondary air over said burner head, a combustor tube mounted to project from said burner head to receive through one end thereof the discharge from said nozzle and secondary air admitted through said peripheral inlets, a deflector tube mounted at one end to project from said burner head in surrounding spaced relation to said combustor tube and projecting substantially coextensively therewith, a housing having a portion surrounding said tubes and defining with said deflector tube a passage communicating at its outer end with the space between said tubes, said combustor tube having openings to communicate the interior thereof with said space, means to admit said secondary air to said passage at the opposite end thereof, said means including aperture means small in size for inflow of air into said passage in high velocity jet form, said housing further including a cap in surrounding relation to said burner head and receiving said secondary air, said cap peripherally interengaging with said housing portion and having an open central portion interengaging with said one end of said combustor tube, said aperture means being formed in said cap intermediate said central portion and the periphery thereof.

7. A low pressure oil burning unit including a discharge nozzle to which air and fuel lines extend, a burner head mounting said nozzle and having peripheral inlets for secondary air to combine with the mixture discharging from said nozzle, means for flowing secondary air over said burner head, a combustor tube mounted to project from said burner head to receive through one end thereof the discharge from said nozzle and secondary air admitted through said peripheral inlets, a deflector tube mounted at one end to project from said burner head in surrounding spaced relation to said combustor tube and projecting substantially coextensively therewith, a housing having a portion surrounding said tubes and defining with said deflector tube a passage communicating at its outer end with the space between said tubes, said combustor tube having openings to communicate the interior thereof with said space, means to admit said secondary air to said passage at the opposite end thereof, said means including aperture means small in size for inflow of air into said passage in high velocity jet form and an annular flame spreader installed in bridging relation to the outer end of said passage and of said space between said tubes. said spreader bridging said housing portion and the outer end of said combustor tube, said housing portion projecting beyond the said outer end of said combustor tube whereby said spreader has the configuration of a section of an inverted cone to contain the combustion flame thereon in a ball form, said spreader being apertured for an air flow therethrough to support the combustion flame.

8. A low pressure oil burning unit including an aspirating discharge nozzle to which air and fuel lines extend, a burner head mounting said nozzle, means for flowing secondary air over said burner head, a combustor tube mounted to project from said burner head to receive through one end thereof the discharge from said nozzle, means to ignite the discharge, a deflector tube located at one end to project from said burner head in a surrounding spaced relation to said combustor tube and projecting substantially coextensive therewith, a housing having a mounting at one end thereof to said burner head and extending to have a portion surround said tubes and define with said deflector tube a passage which communicates at its outer end with the space between said tubes, said combustor tube having openings to communicate the interior thereof with said space, means to admit said secondary air to said passage at the end thereof adjacent said burner head, said means including apertures small in size for inflow to said passage of air in a high velocity jet form and a cap means on the end of said housing remote from said head, said cap means being formed and arranged to overlie the outer end of said passage and the space between said tubes, in a spaced relation to said deflector tube, to produce thereby a back pressure on the secondary air, said cap means having aligned with said combustor tube, at its outer end, a central opening of lesser cross-sectional area than the adjacent end of said combustor tube.

9. A low pressure oil burning unit as in claim 8 characterized by a gun-like tube of limited cross-sectional area fixed to extend coaxially from and to define the central opening in said cap means, said gun-like tube including a plurality of apertures, said secondary air being caused to flow as described and to provide an extension of a flame occurring within said housing substantially the length of said gun-like tube, the apertures of which provide for a lateral projection of direct heat.

10. A low pressure oil burning unit as in claim 8 characterized by said cap means having a projecting portion of conical form the apex of which includes said central opening, said cap means, so formed, providing for a contoured cross-sectional reduction of the flame occurring in the outer end of said housing, and further tube means forming a channel for extension of the flame from said housing, said further tube means connecting at one end thereof to define said central opening in said cap means.

11. A low pressure oil burning unit as in claim 10 wherein said further tube means includes means defining an opening relatively lateral to the axis of said central opening and means mounting in an overlying spaced relation to said lateral opening to provide for a lateral projection and spreading of the extended flame.

12. A low pressure oil burning unit as in claim 8 characterized by the air and secondary air being so provided to produce a first luminous burning of fuel adjacent the outer end of said combustor tube and said cap means being so formed to provide a reduced contoured passage for the flame so occurring to exit from said housing in an extended elongated form under the influence of a portion of said secondary air.

13. A low pressure oil burning unit including a burner head having integrated therewith a motor and a compressor, said compressor being sandwiched between said motor and said head, a low pressure aspirating nozzle opening from said head, a source of fuel supply in connection with said head and in communication with said nozzle, means defining a flow path for air from said compressor to move to and through said nozzle in a high velocity flow to suck fuel from said source to mingle therewith and be atomized thereby on discharge from said nozzle, a combustor tube receiving the discharge from said nozzle, a deflector tube mounted at one end to project from said burner head in a surrounding spaced relation to said combustor tube and substantially coextensive therewith, a housing connected at one end to said burner head and having a portion projecting to surround said tubes and define with said deflector tube a passage which communicates at its outer end with a space between said tubes, said combustor tube having openings to communicate the interior thereof with said space, means for delivering secondary air to said passage at the end thereof adjacent said burner head, said last mentioned means including apertures small in size for the inflow of air to said passage in a high velocity jet form, means for igniting the discharge from said nozzle to burn in a non-luminous condition as it enters and moves through said combustor tube, and a cap means on the end of said housing remote from said head, said cap means being formed and arranged to overlie the outer end of said passage and the space between said tubes, in a spaced relation to said deflector tube, to produce thereby a back pressure on the secondary air and influence a first luminous burning of the ignited discharge from said nozzle adjacent the outer end of said combustor tube, said cap means having aligned with said combustor tube, at its outer end, a central opening of lesser cross-sectional area than the adjacent end of said combustor tube to channel and contour the flame issuing from said housing.

[14. A low pressure oil burning unit comprising a burner head, a low pressure aspirating nozzle mounted in and projected from said head, said nozzle having fuel and aspirating passages, said head having means defining a fuel passage in connection with said nozzle fuel passage, a compressor in connection with said head for delivering a high velocity flow of air to and through said nozzle aspirating and fuel passages, a supply line in connection with said fuel passage incorporating therein a control regulator including a housing having an intermediately positioned diaphragm forming two chambers, one of which is vented to the atmosphere and the other of which has an inlet and an outlet positioned in the line of flow through said regulator and means normally sealing said inlet operative to block the flow of fuel through said other chamber and its outlet and prevent its passage to said nozzle except on the occurrence of a high velocity flow of air through the aspirating and fuel passages of said nozzle.]

*15. The method of delivering liquid fuel to a nozzle of a combustion burner having a fuel and air mixing zone including establishing a supply of liquid fuel, establishing air flow to the mixing zone at substantial velocity to set up aspiration at the nozzle, transmitting aspiration to a first pressure responsive diaphragm, transmitting aspiration from a region of the first pressure responsive diaphragm to a second pressure responsive diaphragm, transmitting aspiration from the region of the second diaphragm to the supply, and controlling valves by the diaphragms whereby liquid fuel flows from the supply through the nozzle to the fuel and air mixing zone.*

*16. Fuel control apparatus for controlling fuel flow from a supply to a fuel delivery nozzle at an air and fuel mixing zone including, in combination, means providing two fuel chambers, a pair of flexible diaphragms respectively forming a wall of each of the fuel chambers, an inlet passage for one of said chambers adapted to be connected with the fuel supply, passage means connecting the fuel chambers, an outlet passage for the other of the chambers connected with the fuel delivery nozzle, a valve in the inlet passage, a valve in the connecting passage means, spring means normally biasing said valves toward closed position, said diaphragms being responsive to pressures at opposite sides thereof for controlling the relative positions of said valves.*

*17. Fuel flow control apparatus for liquid fuels, including in combination, means providing two fuel chambers, a pair of flexible diaphragms respectively forming a wall of each of the fuel chambers, an inlet passage for one of said chambers, passage means connecting the fuel chambers, an outlet passage for the other chamber, a valve in the inlet passage, a valve in the connecting passage means, and resilient means normally biasing the valves toward closed position, said diaphragm being re-*

*sponsive to pressures at opposite sides thereof for controlling the relative positions of said valves.*

*18. Apparatus of the character disclosed, in combination, support means, air moving means mounted by the support means, a motor arranged to drive the air moving means, means providing a supply of liquid fuel, a fuel and air mixing device including a fuel delivery nozzle adjacent which air is projected under pressure from the air moving means, said nozzle arranged to deliver liquid fuel by aspiration established by air delivered by the air moving means, fuel flow control means, tubular means connecting the fuel flow control means with the fuel supply and with the fuel delivery nozzle, said fuel flow control means including housing means providing first and second fuel chambers, a flexible diaphragm for each chamber forming a wall thereof, a fuel inlet duct for the first chamber, a valve for said inlet duct, a connecting duct between said first and second chambers, a valve in said connecting duct, resilient means normally biasing said valves toward closed position, an outlet passage for said second fuel chamber in communication with the tubular means connected with the fuel delivery nozzle, said diaphragms being arranged to be influenced by aspiration adjacent the fuel delivery nozzle to permit opening of the valves to establish fuel flow from the supply through the fuel chambers in sequence to the fuel delivery nozzle.*

References Cited

The following references, cited by the Examiner, are of record in the patented file of this patent or the original patent.

UNITED STATES PATENTS

| | | | |
|---|---|---|---|
| 936,781 | 10/1909 | Kemp | 158—36 |
| 1,450,229 | 4/1923 | Robinson | 158—73 |
| 2,134,083 | 10/1938 | Guenther et al. | 158—42.2 X |
| 2,369,746 | 2/1945 | Miller | 158—42.2 |
| 2,658,567 | 11/1953 | Witherell | 158—76 |
| 2,705,530 | 4/1955 | MacCracken | 158—4 |
| 2,725,929 | 12/1955 | Massier | 158—76 X |
| 3,129,748 | 4/1964 | Varvel | 158—76 |
| 3,169,570 | 2/1965 | Harg et al. | 158—4 |

FOREIGN PATENTS

| | | |
|---|---|---|
| 540,240 | 11/1953 | Belgium. |

EDWARD G. FAVORS, Primary Examiner

U.S. Cl. X.R.

137—505.47